April 29, 1924.
R. STANFORTH
1,491,931
MEASUREMENT OF IRREGULAR SHAPED BUTTON BLANK MATERIAL OR THE LIKE
Filed April 9, 1923
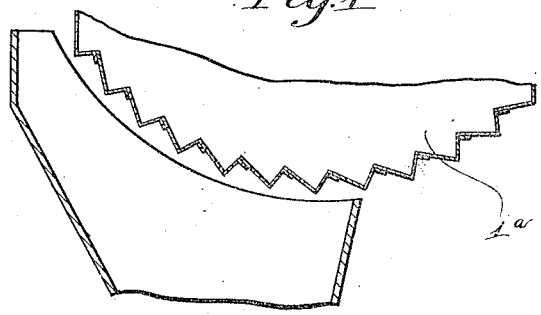
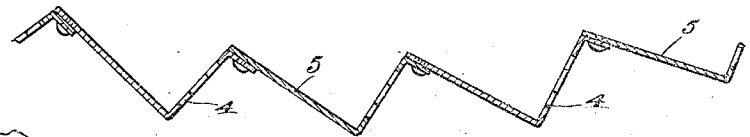
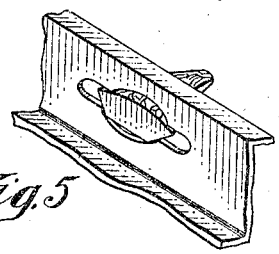
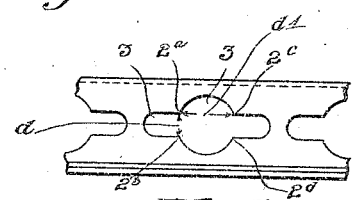
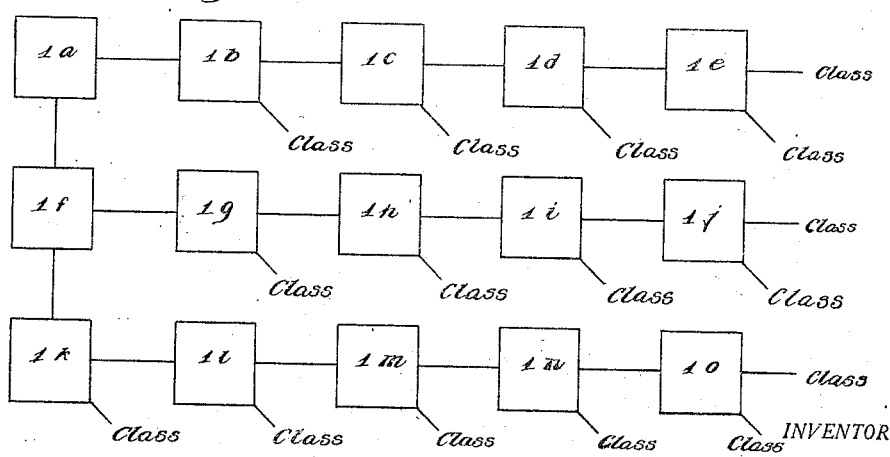
INVENTOR.
Richard Stanforth
BY
his ATTORNEYS.

Patented Apr. 29, 1924.

1,491,931

UNITED STATES PATENT OFFICE.

RICHARD STANFORTH, OF ROCHESTER, NEW YORK, ASSIGNOR TO ART IN BUTTONS, INC., OF ROCHESTER, NEW YORK, A CORPORATION OF NEW YORK.

MEASUREMENT OF IRREGULAR-SHAPED BUTTON-BLANK MATERIAL OR THE LIKE.

Application filed April 9, 1923. Serial No. 631,043.

*To all whom it may concern:*

Be it known that I, RICHARD STANFORTH, a citizen of the United States, and resident of Rochester, in the county of Monroe and State of New York, have invented certain new and useful Improvements in Measurement of Irregular-Shaped Button-Blank Material or the like, of which the following is a specification.

The present invention relates to the measurement or classification of irregularly shaped pieces of material from which buttons, or blanks for disks, buttons, or the like, are produced, and an object of the invention is to provide means which will test each irregularly shaped piece to determine the largest circular blank of a predetermined thickness that can be obtained from such irregularly shaped piece. Another object of the invention is to provide means which will subject each irregularly shaped piece to a large number of tests to determine whether said piece has a thickness and a diameter below or above definite standards. Still a further object of the invention is to provide a classifying drum having a large number of openings, which have their walls provided with two pairs of gauging points, the members of each pair being spaced apart a distance to define a predetermined thickness, while the two pairs are spaced apart a distance to define a predetermined diameter, the irregularly shaped pieces below said predetermined thickness and diameter being discharged from the drum. A still further object of the invention is to provide a classifying means through which an indefinite number of classes may be obtained.

To these and other ends, the invention consists of certain parts, and combinations of parts, all of which will be hereinafter described; the novel features being pointed out in the appended claims.

In the drawings:

Fig. 1 is a fragmentary transverse section through a classifying drum constructed in accordance with this invention;

Fig. 2 is an enlarged fragmentary transverse section of the drum;

Fig. 3 is a fragmentary view of the drum showing the form of one of the classifying openings;

Fig. 4 shows diagrammatically a system of drums through which the classification of the irregularly shaped pieces may be obtained; and Fig. 5 is a perspective view of a typical irregularly shaped nut piece being measured.

Buttons are, most generally, made from irregularly shaped pieces of material, such as shell, bone or nut pieces. When formed from nuts, the pieces, such as $w$, vary considerably in thickness and diameter, as well as in shape, some being substantially circular and others being triangular and of various geometrical forms. It is highly desirable to measure or classify such irregularly shaped pieces with sufficient accuracy that the buttons or blanks cut directly therefrom will be full and complete and at the same time retain the maximum possibilities in buttons, or blanks for disks, buttons, or the like, of the irregularly shaped material. But prior to this invention no mechanical classifying means has been provided which was adapted to measure or classify with any degree of accuracy button material which had a shape other than that of substantially circular form and, as a consequence, the range of the classifying means was limited.

In carrying out the invention, irregularly shaped pieces in bulk of all shapes and sizes may be first delivered to a classifying drum $1^a$ which permits all pieces received therein above a predetermined thickness and diameter to be discharged therefrom into a drum $1^b$, while those below the predetermined thickness and diameter are discharged into a drum $1^f$. The drum $1^b$ discharges the material therein above another predetermined diameter and thickness into the drum $1^c$, while those below said last mentioned diameter and thickness form one class. The drum $1^c$ discharges to the drum $1^d$, and also provides a class of those below the predetermined diameter and thickness defined by drum $1^c$. The same action is performed by the drums $1^d$ and $1^e$, the drum $1^d$ giving one class and the drum $1^e$ giving two classes. Those irregularly shaped pieces retained by the drum $1^f$ are discharged successively into the drums $1^g$, $1^h$, $1^i$ and $1^j$, each of the drums $1^g$, $1^h$ and $1^i$ producing a class and the drum $1^j$ producing two classes. The irregularly shaped pieces discharged from the drum $1^r$ are received in the drum $1^k$, the retained pieces of which are discharged successively in the drums $1^l$, $1^m$, $1^n$ and $1^o$, the drums $1^l$, $1^m$ and $1^n$ each producing a separate class and the drum $1^o$ producing two classes. The material discharged from the drum $1^k$ is the least desirable. The order of the classification is immaterial, the illustrated order being given only as an example.

Each of the classifying drums is the same except for the effective size of its classifying openings. The classifying openings, of which there are a large number in each drum, each embody two pairs of gauging points, one pair being indicated at $2^a$ and $2^b$ and the other pair being indicated at $2^c$ and $2^d$. The members of each pair are separated a distance $d$ corresponding to the approximate thickness or length of the circular blank $y$ to be defined in each irregularly shaped piece of the class, while the two pairs are separated from each other a distance $d^1$ equal to the diameter of the circular blank $y$ to be defined in each irregularly spaced piece. It will be noted that between the points, enlarged spaces 3 are provided. The purpose of these spaces is to receive those portions 3 of the irregularly shaped pieces beyond the proposed circular blanks, thus adapting the openings to the irregular shapes of the pieces. As each drum has a very large number of classifying openings, it is apparent that each piece will, after a certain length of time, be subjected to the testing action of a large number of these openings, and at different points about its perimeter or circumference so that each piece is tested in all directions to determine whether it is above or below a predetermined thickness and diameter defined by the opening.

The classifying element is herein described as being in the form of a drum, but it will be understood that it is not limited to this arrangement and may be any movable element which has gauging points with spaces between them adapted to give the results of this invention. When a drum is employed it is preferred to provide the wall of the drum with portions 4 extending substantially radially of the axis of turning of the drum and also with portions 5, which, with the portions 4, form pockets interiorly of the drum in which the irregularly shaped pieces are collected so that they will be presented edgewise to the testing openings formed in the portions 4 as the drum rotates in the direction of the arrow. When a position above the axis of the drum is reached, the pieces which have not passed through the portion 4 fall from the pockets to a lower portion of the drum where they are again collected in other pockets to be subjected to another testing action. After the drum is rotated for a sufficient length of time to cause each irregularly shaped piece to be subjected to a test about its entire circumference or perimeter, the pieces remaining in the drum are discharged to a drum testing for the next size as hereinbefore pointed out.

From the foregoing it will be seen that there has been provided a classifying means which will subject each irregularly shaped piece to a large number of tests to determine the maximum possibilities in buttons, or blanks for disks, buttons, or the like, contained therein, considering both diameter and thickness. By using a movable classifying element having four gauging points spaced apart, it is possible to mechanically classify irregularly shaped pieces which have triangular or other geometrical forms. Furthermore, by reason of the fact that the gauging points are comparatively small, due to being formed from sheet metal, or similar material, these points readily enter the recesses or other indentations in the irregularly shaped pieces and test for diameter and thickness in these recessed portions or indentations, a result which is not obtainable when a continuous gauging edge is provided. It will also be noted that by this classifying means, it is possible to automatically and mechanically classify irregularly shaped pieces of practically any shape for the obtaining of the maximum desirable yield in disks, or blanks for buttons, or the like, therefrom.

When using irregularly shaped material, such as the nut pieces illustrated in the drawings, the diameter of the buttons or blanks obtainable therefrom is dependent upon the thickness of such buttons or blanks and vice versa, so that if buttons or blanks of maximum diameter are desired, each irregularly shaped piece may be classified according to the maximum diameter of a single button or blank of minimum thickness contained therein, whereas if the largest number of buttons or buttons of maximum thickness are desired, this may be the guiding factor in the classification. These results are obtained by varying the distances between the members of each pair of gauging points in the classifying element, as desired.

The expression "maximum desirable" as used in connection with yield in buttons, or blanks for disks, buttons, or the like, from the irregularly shaped pieces, means yield of maximum value, which is governed by trade or market conditions.

What I claim as my invention and desire to secure by Letters Patent is:

1. Means for classifying irregularly shaped pieces of material as to the maximum desirable yield in buttons, or blanks, for disks, buttons, or the like, obtainable therefrom, comprising a movable member having two pairs of opposed gauging points with spaces between them and adapted to be held against movement with respect to each other during the movement of the member.

2. Means for classifying irregularly shaped pieces of material as to the maximum desirable yield in buttons, or blanks for disks, buttons, or the like, obtainable therefrom, comprising a movable member having openings, the wall of which have two pairs of opposed gauging points with spaces between them in which portions of the irregularly shaped pieces beyond the measured portions may project.

3. Means for classifying irregularly shaped pieces of material as to the maximum desirable yield in buttons, or blanks for disks, buttons, or the like, obtainable therefrom, comprising a movable member having openings, the walls of which have two pairs of gauging points with spaces between them, in which portions of the irregularly shaped pieces beyond the measured portions may project, the two pairs of gauging points being spaced apart a distance to define a predetermined diameter at a predetermined thickness defined by the distance between the members of the pairs.

4. Means for classifying irregularly shaped pieces of material as to the maximum desirable yield in buttons, or blanks for disks buttons, or the like, obtainable therefrom, comprising a plurality of movable classifying elements, each having two pairs of gauging points with spaces between them into which portions of the irregularly shaped pieces beyond the measured portions may project, the distance between the two pairs of gauging points being such as to test for a predetermined diameter in each irregularly shaped piece at a predetermined thickness defined by the distance between the members of the pairs, the distance between the pairs as well as between the members of the pairs varying in the different movable classifying elements but being alike in each classifying element.

5. Means for classifying an irregularly shaped piece of material as to the maximum desirable yield in buttons, or blanks for disks, buttons, or the like, obtainable therefrom, comprising a rotary drum having its walls formed with portions extending substantially radially of the axis of the drum and provided with openings, the walls of which are formed with gauging points.

6. Means for classifying an irregularly shaped piece of material as to the maximum desirable yield in buttons, or blanks for disks, buttons, or the like, obtainable therefrom, comprising a rotary drum having its walls formed with portions extending substantially radially of the axis of the drum and provided with openings, the walls of which are formed with gauging points, and portions connecting said radially extending portions and arranged to present the material to the classifying openings on the rotation of the drum.

RICHARD STANFORTH.